United States Patent Office 3,020,259
Patented Feb. 6, 1962

3,020,259
POLYOLEFINS STABILIZED WITH REACTION PRODUCTS OF NONYLPHENOL AND CARBONYL COMPOUNDS
Felix Schüde, Bad Soden (Taunus), and Otto Mauz, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 3, 1958, Ser. No. 758,699
Claims priority, application Germany Sept. 7, 1957
6 Claims. (Cl. 260—45.95)

The present invention relates to a process for stabilizing polymers of low pressure olefins.

The polymerization products of olefins of high degree of polymerization have gained an increasing industrial importance in the last years. The macromolecular compounds have thermoplastic properties, that is to say they can be shaped in various ways under the action of heat and pressure. There may be produced by means of suitable devices filaments, films, blocks, plates, hollow bodies and like structures. In the course of said processing, which is carried out at elevated temperature, a degradation of the polymer chains takes place and fractions of the macromolecule are formed which impair the technological properties of the starting material, such as stability, elongation and hardness. Said degradation, occurring at higher temperatures already after a little while, also appears at room temperature and under the action of light after longer periods. A great number of investigations have already been carried through with regard to the cause of a degradation of this kind which seem to be suitable to elucidate the chemical mechanism of the degradation reaction. It can be supposed that a cleavage takes place at the so-called "weak" positions of the macromolecule. The weak positions may be double bonds, vinyl and vinylidene groupings or also tertiary and quaternary carbon atoms which, as known from reactions of low molecular compounds, possess an increased reactivity.

Said instability of the polymers has already been observed in the case of polyethylene prepared under high pressure and at elevated temperature in the presence of oxygen or peroxides as catalysts. An extensive literature exists with regard to compounds having been examined as stabilizers for said polymer. Various classes of chemical compounds have been found to be effective. Phenol derivatives, amines, sulfur and organic sulfur compounds have been proposed as stabilizers. Furthermore there have been mentioned organic and inorganic pigments such as silicic acid, silicates, soot, and other organic and inorganic pigments which are simultaneously dyestuffs.

A stabilizer complying with the requirements of practice shall have the following properties:

(1) It shall protect the polymer from degradation when the latter is subjected for a prolonged period to the action of light and/or elevated temperatures, above all in the presence of oxygen.

(2) It shall not discolor the polymer even at higher temperatures.

(3) It shall not migrate out of the polymer.

(4) It shall have a poor volatility and no odor.

(5) It shall be physiologically harmless.

(6) The amounts of stabilizer required for an effective protection of the polymer shall be small.

A great number of stabilizers is known for polymerization products of ethylene produced by the high pressure process mentioned above. In U.S. Patent 2,434,662 there are mentioned for example phenol derivatives such as diphenylol propane and discresylol propane. In U.S. Patent 2,538,355 similar derivatives of methane are described containing alkyl radicals of 1–8 carbon atoms bound to the benzene nucleus. In Canadian Patent 470,325 the condensation products of phenol and cyclohexanone are described as effective stabilizers for high pressure polyethylene.

Furthermore in U.S. Patent 2,675,366 there are disclosed 2,2'-methylene-bis-4,6-dialkyl phenols as stabilizers for polyethylene. Australian Patent 4,110/54 describes sulfur-containing phenol derivatives, for example the 4,4'-thio-bis-(6-tert.-butyl-m-cresol), displaying a good stabilizing effect for high pressure polyethylene.

Said compounds known as stabilizers for high pressure polyethylene practically fail to work in the case of a new class of polymeric olefins, namely the so-called low pressure polyolefins as disclosed in Belgian Patents 533,362, 534,792, 534,888, 540,459, Italian Patent 526,101 and Irish Patent 668/55. The processes for the manufacture of low pressure polyolefins are described in detail by Raff, Allison, "Polyethylene," 1956, pages 72–81 and particularly pages 77–82. For example, the said low pressure polypropylene or polybutene-1 may be prepared by the polymerization of propylene or butene-1 in the presence of a catalytic amount of a catalyst prepared from a mixture of an organo-aluminum compound and a salt of a heavy metal of subgroups IV$b$–VI$b$ of the periodic table.

Now we have found that the reaction products of nonyl phenol with carbonyl-containing organic compounds obtained with the use of mineral acids as dehydrating agent surprisingly constitute an excellent stabilizer for polymers produced from olefins having tertiary carbon atoms. As nonyl phenol there may be used an industrial product substantially consisting of p-nonyl phenol. In one portion of the molecules the nonyl chain is straight and in another portion brauched. The nonyl component for the nonyl phenol is prepared, for example, by trimerization of propylene according to a process described by Anzis and Petrow in: Reports of the Academy of Sciences, U.S.S.R., 70 (1950), page 425. As carbonyl-containing compounds for the production of the reaction product with nonyl phenol used as stabilizer in the process of the invention there are suitable, for example, formaldehyde, acetaldehyde, acetone, methylethyl ketone, cyclohexanone, benzaldehyde, i.e. there may be used straight chain as well as cyclic carbonyl-containing organic compounds having either an aldehyde or a ketone character. It is of advantage to employ acetone for the production of the stabilizer used in the process of the invention. For the aforesaid polymers produced from olefins having tertiary carbon atoms there is particularly effective as stabilizer the bis-(nonyl-hydroxyphenyl)-propane formed in the reaction mixture when condensing nonyl phenol with acetone. In the following the condensation product bis-(nonyl-hydroxyphenyl)-propane is named dinonyl-diane.

The dinonyl-diane is an oil which is distillable at 180–210° C. under a pressure of 0.1 mm. of mercury. The distillate constitutes a very viscous liquid.

As mineral acids favoring the splitting off of water in the condensation of nonyl phenol with carbonyl-containing compounds there may be used hydrochloric acid of 35% strength or hydrochloric acid gas which is introduced into the reaction mixture until the organic phase is saturated (acetone absorbs hydrochloric acid gas) or sulfuric acid of 10–70% strength. As polymers which can be stabilized with the reaction product according to the invention of nonyl phenol with carbonyl-containing compounds there are suitable polymers that have been produced from olefins containing tertiary carbon atoms, for example polypropylene or polybutene. Polymers of this kind are preferably prepared by the low pressure process described by Raff, Allison, "Polyethylene," 1956, pages 72–81, particularly page 78 and seq. There may, of course, also be stabilized by the process of the invention copolymers of propylene (which contains tertiary carbon atoms) with ethylene (which does not contain tertiary carbon atoms) since copolymers of this kind contain tertiary carbon atoms in the macromolecule in a larger amount and in regular sequence. The tertiary carbon atoms in the macromolecule are probably responsible for a high sensibility of the polymers with respect to oxygen, particularly at elevated temperatures or under the action of light.

Said sensibility becomes apparent by the reduction of the specific viscosity of a sample or the tendency to become brittle of shaped articles or also by the absorption of oxygen by the polymer.

The fact that high pressure polyethylene differs from the aforesaid new class of olefin polymers in the degradation behavior seems to be self-evident. High pressure polyethylene which can be well stabilized by means of the substances already described has a much smaller number of branchings as compared with the aforesaid polyolefins in which each second carbon atom may be tertiary. Quantitative analysis of ultra-red spectra of high pressure polyethylene showed for example 21.5 methyl and 14 ethyl branchings per 1000 carbon atoms (D. C. Smith, Ind. Engng. Chem. 48/7 (1956), page 1161), that is to say in the case of weakly branched high pressure polyethylene the content of tertiary carbon atoms in the chain is about one order of magnitude smaller than, for example, in the case of polypropylene or polybutylene.

The stabilizer of the present invention largely complies with the requirements described above.

The effective concentration of the stabilizer varies between 0.05 and 5%, preferably between 0.3 and 1.0%. In general, an amount of 0.5% of the reaction product of nonyl phenol with carbonyl-containing compounds is fully sufficient in order to obtain a permanent stability of the polyolefins mentioned.

The polyolefins having tertiary carbon atoms are best admixed with the stabilizer according to the invention by way of a mixture consisting of a large amount of stabilizer and a small amount of polyolefin (master batch).

For this purpose a concentrated solution (of about 60% strength) of the reaction product of nonyl phenol with carbonyl-containing compounds in acetone or methylene chloride, for example, is mixed with a small amount of the powdery polymerization product to be stabilized in a proportion such that, after the evaporation of the solvent, the mixture contains about 15–40% of stabilizer. When operating in this manner there is obtained a dry powder which can be blended in usual manner into the polymer to be stabilized. Thus the concentration of the stabilizer in the final mixture can be adapted to the requirements.

It is of course likewise possible to incorporate the stabilizer of the invention into the polymerization products in the course of their production or their working up. Said mode of operation offers the special advantage that the polymer is early protected against the action of light or atmospheric oxygen, particularly at higher temperatures, that is to say already in the course of the preparation or working up.

Moreover it is possible to introduce the reaction product of nonyl phenol with carbonyl-containing compounds into the aforesaid polymers together with known anti-agers or processing auxiliaries. In admixture with other stabilizers there may be obtained, in some cases, a synergistic effect. As additives of this kind there may be employed alkyl-substituted phenols and naphthols such as 2,6-di-tert.butyl-p-cresol, nonyl-$\beta$-naphthol etc.; aliphatic and aromatic thio-ethers such as bis-(4-hydroxy-2-methyl-5-tert.butyl-phenyl)-sulfide; N-alkyl- or N,N-dialkyl derivatives of p-phenylene diamine; N-acyl derivatives of p-amino-phenol and compounds such as bis-(2,4,6-trihydroxy-phenyl)-sulfide, bis-(hydroxy-nonyl-naphthyl)-sulfide, bis-(hydroxymethyl-sec.propyl-phenyl)-sulfide and dithio-phenol-2-carboxylic acid.

The polyolefins having tertiary carbon atoms in regular sequence and copolymers made from at least one starting component possessing tertiary carbon atoms which have been stabilized in this manner can be processed by known molding methods such as pressure, injection or extrusion molding processes. When the polymerization products treated as described above are tempered at 100 or 120° C. they become brittle after a considerably longer time than polymers stabilized in the same manner with known substances of the indicated class. It can likewise be observed that the degradation of the material, measured by the decrease of the reduced viscosity, is considerably smaller than in the case of the corresponding comparison mixtures.

The following table gives the periods of embrittlement at 120° C. measured for polypropylene, polybutene and low pressure polyethylene (for the purpose of comparison) containing each time 0.5% of the stabilizer indicated. The time of embrittlement is the period in days after which a pressed film of polyolefin having a thickness of 1 mm. breaks on bending.

STABILIZATION OF POLYPROPYLENE, POLYBUTENE, LOW PRESSURE POLYETHYLENE

| stabilizer | polypropylene embrittlement in days | color and general behavior | polybutene-(1) embrittlement/days | color and general behavior | low pressure polyethylene embrittlement in days | color and general behavior |
|---|---|---|---|---|---|---|
| 4,4'-dihydroxydiphenyl-dimethylmethane | 40 | sticky, slightly colored | 27 | sticky, slightly colored | 25 | colored |
| di-o-cresylol propane | 20 | slightly sticky | 15 | slightly sticky | 17 | Do. |
| di-(hydroxyphenyl)-cyclohexane | 25 | slightly colored | 10 | slightly colored | 15 | Do. |
| dioctyldiane | 32 | .....do............ | 17 | .....do............ | 25 | slightly colored |
| reaction product of nonylphenol with acetone | 200 | no coloration, no stickiness | 172 | no coloration, no stickiness | 32 | no coloration |

It clearly results from the table that the use of the reaction product of nonyl phenol with acetone represents an important technical advance as compared with known stabilizers of the same type.

The time until the embrittlement sets in is considerably longer than with the use of other substances (for example the substances indicated in the table). A substantial advantage consists in the fact that the reaction product of nonyl phenol with acetone is excellently compatible with the polyolefins to be considered. In the course of the aging or while tempering an emigration of the incorporated stabilizer out of the polymer has in no case been observed. The molded article made from the polymer always keeps a lustrous surface which is free from stickiness.

A further great advantage of the reaction product of nonyl phenol with acetone is the great fastness to light and color fastness of the polymers stabilized therewith. drating agent, with formaldehyde.
Polypropylene or polybutene stabilized with the aforesaid substance does not change its color to a noteworthy degree on tempering or on irradiation.

Measurements of the reduced viscosity prove that practically no degradation takes place when tempering polymers of the kind mentioned above which have been treated with the stabilizers of the invention.

Also in comparison with usual stabilizers having a different constitution the stabilizers of the invention exhibit various advantages. All known stabilizers cause a discoloration of the material on tempering a polymer of the aforesaid class which has been stabilized therewith. Furthermore no antiager has been known which does not change the surface structure on tempering. These detrimental phenomena can be done away with by stabilizing with the stabilizers according to the invention.

The following example serves to illustrate the invention but it is not intended to limit it thereto.

*Example*

Low pressure polyethylene (for the sake of comparison), low pressure polypropylene and low pressure polybutene were thoroughly mixed with 0.5% each of the following antiagers (a) Reaction product of nonyl phenol with acetone
(b) 4,4'-dihydroxy-diphenyl-dimethyl-methane
(c) Di-o-cresylol propane
(d) Di-(hydroxy-phenyl)-cyclohexane
(e) Reaction product of nonyl phenol with formaldehyde
(f) Reaction product of nonyl phenol with acetaldehyde From these mixtures sheets having a thickness of 1 mm. were prepared by the pressure molding process.

From the same mixtures bands having a thickness of about 2 mm. and a width of 5 cm. were produced by the extrusion molding. The major part of the bands was granulated and from the granules sheets of 1 mm. thickness were produced by injection molding.

The pressed sheets, the extrusion bands and the injection molded sheets were tempered at 120° C. and the time was determined in which the sheets became brittle. The following table gives the periods of embrittlement observed.

of a catalyst prepared from a mixture of an organo-aluminum compound and a salt of a heavy metal of subgroups IVb–VIb of the periodic table, and 0.05–5% by weight of the product formed by the reaction of nonyl phenol, in the presence of a mineral acid dehydrating agent, with a member selected from the group consisting of formaldehyde, acetaldehyde, acetone, methylethyl ketone, cyclohexanone and benzaldehyde.

2. As a new composition of matter, a solid copolymer of ethylene with a member selected from the group consisting of propene and butene-1, at least one repeating unit of the copolymer containing tertiary carbon atoms, said copolymer being prepared by the polymerization of the aforesaid olefins in the presence of a catalytic amount of a catalyst prepared from a mixture of an organo-aluminum compound and a salt of a heavy metal of subgroups IVb–VIb of the periodic table, said copolymer containing 0.05–5% by weight of the product formed in the reaction of nonyl phenol, in the presence of a mineral acid dehydrating agent, with a member selected from the group consisting of formaldehyde, acetaldehyde, acetone, methylethyl ketone, cyclohexanone and benzaldehyde.

3. Solid low pressure polypropylene stabilized with 0.05–5% by weight of the product formed in the reaction of nonyl phenol in the presence of a mineral acid dehydrating agent, with a member selected from the group consisting of formaldehyde, acetaldehyde, acetone, methylethyl ketone, cyclohexanone, and benzaldehyde, said polypropylene being prepared by the polymerization of propylene in the presence of a catalytic amount of a catalyst prepared from a mixture of an organo-aluminum compound and a salt of a heavy metal of subgroups IVb–VIb of the periodic table.

4. Solid low pressure polybutene-1 stabilized with 0.05–5% by weight of the product formed in the reaction of nonyl phenol, in the presence of a mineral acid dehydrating agent, with a member selected from the group consisting of formaldehyde, acetaldehyde, acetone, methylethyl ketone, cyclohexanone and benzaldehyde, said polybutene-1 being prepared by the polymerization of butene-1 in the presence of a catalytic amount of a catalyst prepared from a mixture of an organo-aluminum compound and a salt of a heavy metal of subgroups IVb–VIb of the periodic table.

5. As a new composition of matter, a solid polymer produced from an olefin selected from the group consisting of propene and butene-1, said polymer containing tertiary carbon atoms and being prepared by the polymerization of the olefin in the presence of a catalytic

PERIODS OF EMBRITTLEMENT IN DAYS

| antiager | polypropylene | | | polybutene-(1) | | | low pressure polyethylene (for comparison) | | |
|---|---|---|---|---|---|---|---|---|---|
| | press sheet | extrusion band | injection sheet | press sheet | extrusion band | injection sheet | press sheet | extrusion band | injection sheet |
| reaction product of nonyl phenol and acetone | 200 | 200 | 50–150 | 172 | 167 | 30–95 | 32 | 30 | 5 |
| 4,4'-dihydroxy-diphenyl-dimethylmethane | 40 | 35 | 15 | 27 | 20 | 11 | 25 | 12 | 7 |
| di-o-cresylol propane | 20 | 21 | 12 | 15 | 15 | 7 | 17 | 18 | 7 |
| di-(hydroxyphenyl)-cyclohexane | 25 | 21 | 13 | 10 | 11 | 7 | 15 | 7 | 10 |
| reaction product of nonyl phenol and formaldehyde | ---------- | ~150 | 50–130 | 160 | 150 | 30–90 | ---------- | ---------- | ---------- |
| reaction product of nonyl phenol and acetaldehyde | ---------- | ~150 | 50–130 | 160 | 150 | 30–90 | ---------- | ---------- | ---------- |
| without addition | 1–2 | ---------- | 1 | 1–2 | ---------- | 1 | 2–4 | ---------- | 2–4 |

We claim:

1. As a new composition of matter, a solid polymer produced from an olefin selected from the group consisting of propene and butene-1, said polymer containing tertiary carbon atoms and being prepared by the polymerization of the olefin in the presence of a catalytic amount of a catalyst prepared from a mixture of an organo-aluminum compound and a salt of a heavy metal of subgroups IVb–VIb of the periodic table, and 0.05%–5% by weight of the product formed by the reaction of nonyl phenol, in the presence of a mineral acid dehydrating agent, with acetone.

6. As a new composition of matter, a solid polymer produced from an olefin selected from the group consisting of propene and butene-1, said polymer containing tertiary carbon atoms and being prepared by the polymerization of the olefin in the presence of a catalytic amount of a catalyst prepared from a mixture of an organo-aluminum compound and a salt of a heavy metal of subgroups IV$b$–VI$b$ of the periodic table, and 0.05%–5% by weight of the product formed by the reaction of nonyl phenol, in the presence of a mineral acid dehy- References Cited in the file of this patent

UNITED STATES PATENTS

| | | |
|---|---|---|
| 2,434,662 | Latham et al. | Jan. 20, 1948 |
| 2,731,442 | Forman | Jan. 17, 1956 |
| 2,824,090 | Edwards et al. | Feb. 18, 1958 |
| 2,833,755 | Coover | May 6, 1958 |

FOREIGN PATENTS

| | | |
|---|---|---|
| 470,325 | Canada | Dec. 26, 1950 |

UNITED STATES PATENT OFFICE
CERTIFICATE OF CORRECTION

Patent No. 3,020,259                      February 6, 1962

Felix Schülde et al.

It is hereby certified that error appears in the above numbered patent requiring correction and that the said Letters Patent should read as corrected below.

Column 5, line 7, strike out "drating agent, with formaldehyde.", and insert the same after "dehy-" in column 7, line 10.

Signed and sealed this 14th day of May 1963.

(SEAL)
Attest:

ERNEST W. SWIDER
Attesting Officer

DAVID L. LADD
Commissioner of Patents